United States Patent [19]

Maher

[11] Patent Number: 4,959,636
[45] Date of Patent: Sep. 25, 1990

[54] SEARCH HEAD FOR METAL DETECTORS

[75] Inventor: Anthony J. Maher, Vermont South, Australia

[73] Assignee: Detection Systems Pty. Ltd., Australia

[21] Appl. No.: 285,607

[22] Filed: Dec. 15, 1988

[30] Foreign Application Priority Data

Dec. 17, 1987 [AU] Australia ................... PI5964

[51] Int. Cl.⁵ .................... G08B 13/14; G01V 3/08
[52] U.S. Cl. .................... 340/568; 324/239; 324/327
[58] Field of Search ............... 340/568, 571, 572, 661; 324/239, 327, 329

[56] References Cited

U.S. PATENT DOCUMENTS

| | | | |
|---|---|---|---|
| 3,950,696 | 4/1976 | Miller et al. | 340/568 X |
| 4,024,468 | 5/1977 | Hirschi | 324/329 |
| 4,091,322 | 5/1978 | Stankoff | 324/329 |
| 4,263,553 | 4/1981 | Cook et al. | 324/327 |
| 4,659,989 | 4/1987 | Kerr | 324/239 X |
| 4,795,995 | 1/1989 | Eccleston et al. | 340/572 X |

Primary Examiner—Donald O. Woodiel
Assistant Examiner—Thomas J. Mullen, Jr.
Attorney, Agent, or Firm—Lowe, Price, LeBlanc, Becker & Shur

[57] ABSTRACT

A search head for a metal detector, the head comprising a support body and three conductive loops mounted on the body, the loops being formed from a single ribbon cable. An oscillating signal is applied to one of the loops and induced voltages in the other two loops are subtracted, the arrangement being such that a difference will appear in the subtracted voltages when a metal object is closer to the other two loops.

10 Claims, 6 Drawing Sheets

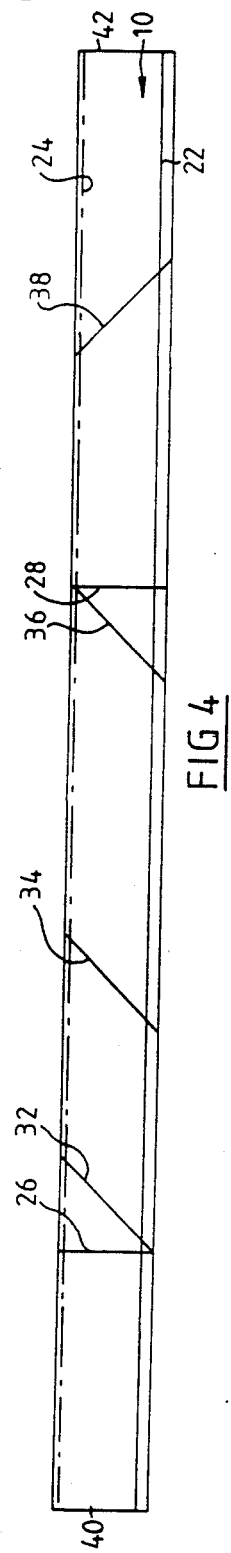
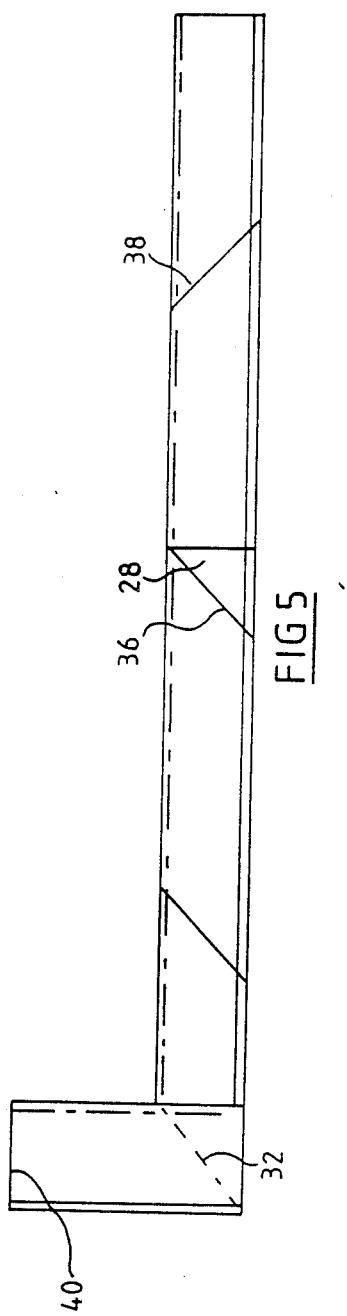
FIG 3
FIG 4
FIG 5

SEARCH HEAD FOR METAL DETECTORS

TECHNICAL FIELD

This invention relates to a search head for a metal detector.

DISCLOSURE OF THE INVENTION

The general object of the invention is to provide a novel search head for induction type metal detectors, the head being of relatively simple construction and convenient to use.

According to the first aspect of the invention there is provided a search head for a metal detector, said head comprising a support body and at least one conductive loop mounted on the body characterized in that the loop is formed from ribbon cable.

Preferably, the cable has a plurality of conductors in a single layer.

Preferably further, the cable is folded such that selected conductors in said cable form loops of the same effective area.

Preferably further, there are first, second and third loops, the first and second being formed at respective edges of the cable and the third loop being formed at or near the centre of the cable. In this arrangement, an oscillating signal can be applied to the third loop and the outputs of the first and second loops monitored so as to operate as an induction-balance metal detector. It is preferred that the first and second coils are coupled together so that induced voltages therein subtract from one another, the arrangement being such that a difference will appear in the substracted voltages when a metal object is closer to one or other of the first or seconod loops.

The invention also provides a search head for a metal detector comprising a generally U-shaped support body and at least one induction coil mounted on the body.

BRIEF DESCRIPTION OF THE DRAWINGS

The invention will now be further described with reference to the accompany drawings, in which:

FIG. 3 shows a cross-section through a typical ribbon cable,

FIG. 4 to 9 show stages in folding the ribbon cable.

FIG. 11 is a circuit diagram for a metal detector constructed in accordance with the invention.

BEST MODE FOR CARRYING OUT THE INVENTION

Figure 1:
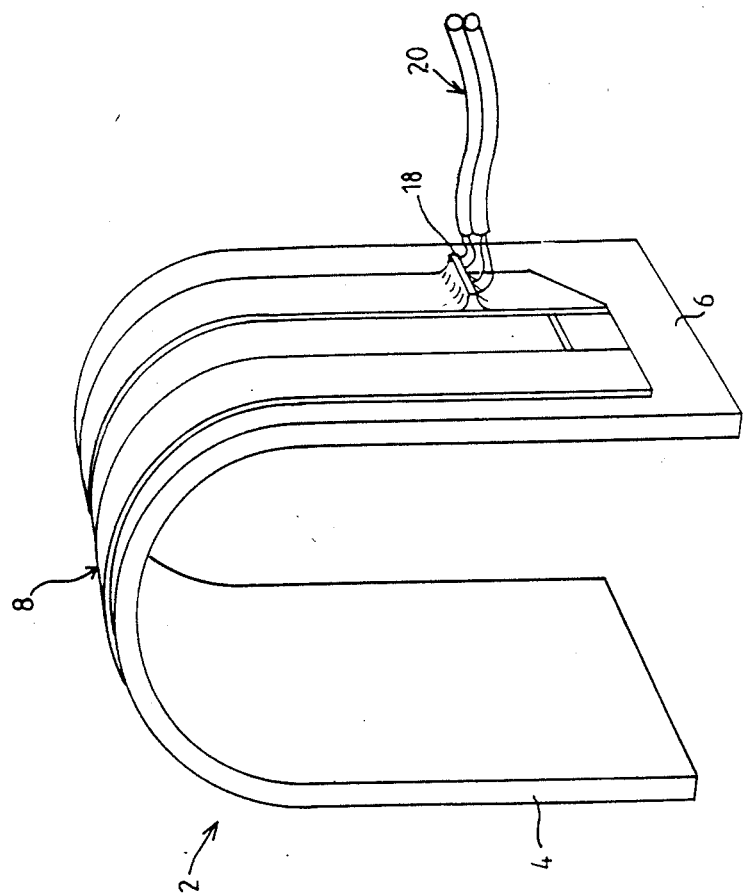
FIG. 1 is a perspective view of a search head of the invention.
Figure 1A:
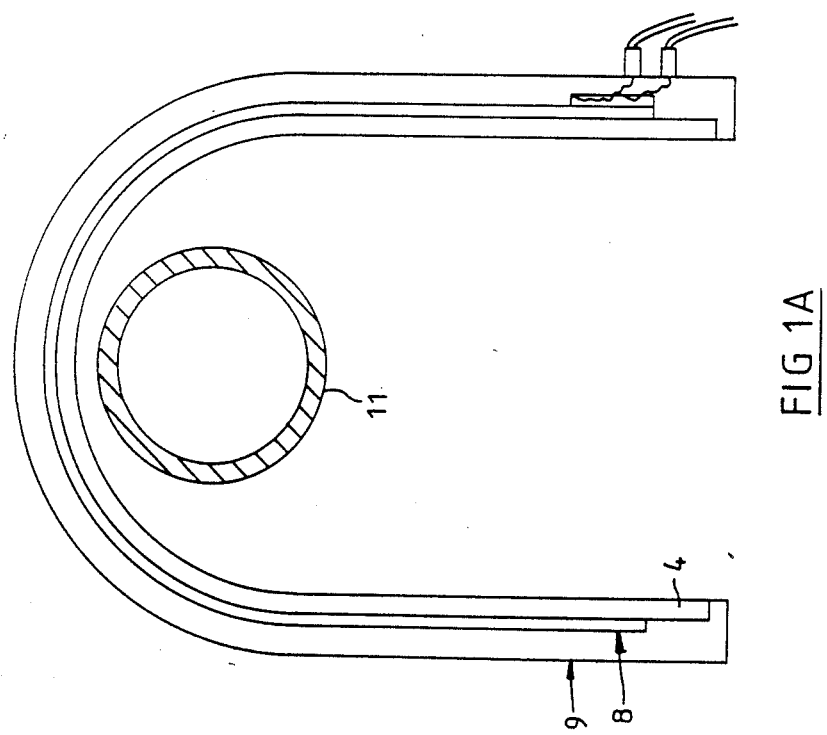
FIG. 1A is a diagramatic cross-section showing the head on a conduit.
Figure 2:
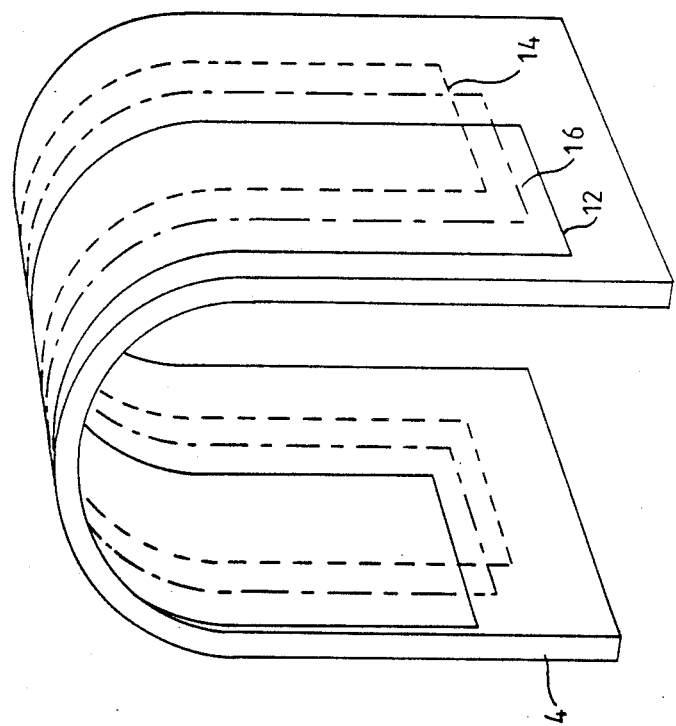
FIG. 2 is schematic view showing the location of the three coils of the head.

The search head 2 illustrated in FIG. 1 comprises a generally U-shaped non-metallic support body 4 which has conductive paint applied to its outer surface 6. The conductive paint functions as an electro-static shield. A loom 8 of ribbon cable is mounted on the outer surface 6, the cable 10 having a single layer multi-conductor structure as shown in cross-section is FIG 3. The cable 10 is foleded and connected in such a way that there are first, second and third loop coils 12, 14 and 16 formed within the loom 8. The coils are diagramatically illustrated in FIG. 2, the first coil 12 being shown in solid lines, the second coil 14 is broken lines, and the third coil 16 being shown in chain lines. The loom 8 includes connections at 18 in order to form the coils 12, 14 and 16 and to couple the coils to cables 20 for input and output signals. The body 4 and loom may be located within a generally U-shaped housing 9 so as to protect the coils and electrically shield the coils as shown in Figure 1A. It is preferred that the housing is made from stainless steel. It is also preferred that the space between the housing and the body 4 is filled with epoxy resin (not shown) in order to fix the body 4 and loom firmly in position relative to the housing.

Because the head is generally U-shaped it can very readily be placed upon a conduit 11 which is to be monitored for particles of metal passing therethough. It will be appreciated that the open side of the head permits it to be placed on the conduit 11 without the need to have access to a free end of the conduit. In most known induction type metal detectors, the coils need to encircle the conduit and therefore it is necessary to have a free end of the conduit in order to place and remove the head. These closed loop detectors are therefore much more cumbersome and inflexible to use than are the heads of the invention.

In the preferred embodiment of the invention, an oscillating signal is applied to the third coil 16 so that voltages will be induced in the first and second coils 12 and 14. The coils 12 and 14 have inherently the same effective area because of the ribbon cable construction and are symmetrically disposed with respect to the third coil 16 and thus the voltages induced in the first and second coils will be equal. The voltages in the coils 12 and 14 can be subtracted so that in a normal condition there is a zero resultant output from the combined output of the coils 12 and 14. If however a metal object passes through the head it will first be closer to one or other of the coils 12 or 14 (depending on the direction in which passes through the head) and then closer to the opposite coil. This leads to an imbalance in the subtracted voltages induced in the coils 12 and 14, thereby generating an output signal which can be detected by suitable circuitry. The existence of the output signals indicates the passage of a metallic object through the head. The most sensitive part of the head is that region near the curved apex because, near the lower ends of the coils 12 and 14, the disturbances caused by a metal object tend to cancel out. It will be appreciated that it is important that the coils 12 and 14 have the same effective area so that the voltages induced therein will be equal.

FIGS. 4 to 9 show a preferred way of folding the ribbon cable 10 in order to achieve an equality of areas for the coils 12 and 14, as well as coil 16.

FIG. 4 shows a strip of the ribbon cable 10 having peripheral conductors 22 and 24 and ends 40 and 42. The cable 10 is folded at transverse fold lines 26 and 28 and diagonal fold lines 32, 34, 36, and 38. The first step is to rotate the end 40 through 90° by first folding along line 26 then along line 32 so as to assume the configuration as shown in FIG. 5. The next step is to rotate the end 42 through 90° about fold line 34 so as to assume the configuration shown in FIG. 6. The next step is to rotate the end 42 through 90° by folding about line 28 and then along line 36 so as to assume the configuration shown in FIG. 7. Finally, the end 42 is rotated towards the end 40 folding about the line 38 so that the two ends 40 and 42 abut or are adjacent to one another so as to assume the configuration shown in FIG. 8.

It will be appreciated that the edge conductor 22 forms a loop which is effectively rectangular in shape. It has however an additional, overlapping portion indicated by numeral 44 but any voltages induced in the overlapping part 44 will be very small as the wire forms a low inductance hairpin so that the effective shape of the overall loop is a rectangle. Similarloy, the other edge conductor 24 forms an effectively rectangular loop. It too has additional overlapping portion indicated by reference numeral 46 but again the voltages in the overlapping portion 46 will be very small so that the effective shape is rectangular. As can be seen from FIG. 8, the effective rectangular loops formed by the edge conductors 22 and 24 are identical in area. It will be appreciated that the central conductor of the cable 10 (not marked in FIGS. 4 to 8) will have the same area as the peripheral conductors 22 and 24 and will be disposed symmetrically between those conductors.

Figure 8:
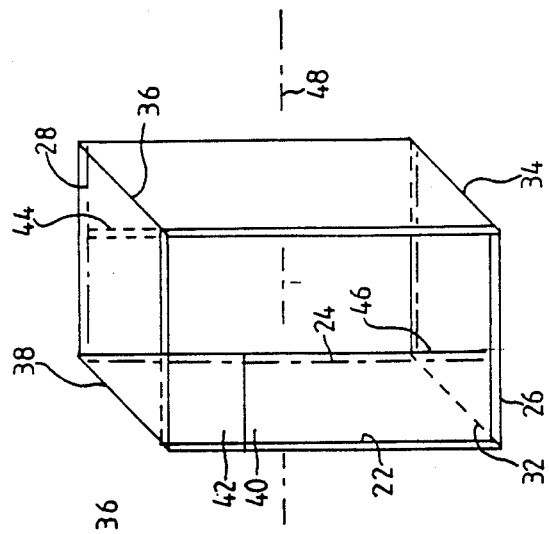
Figure 7:
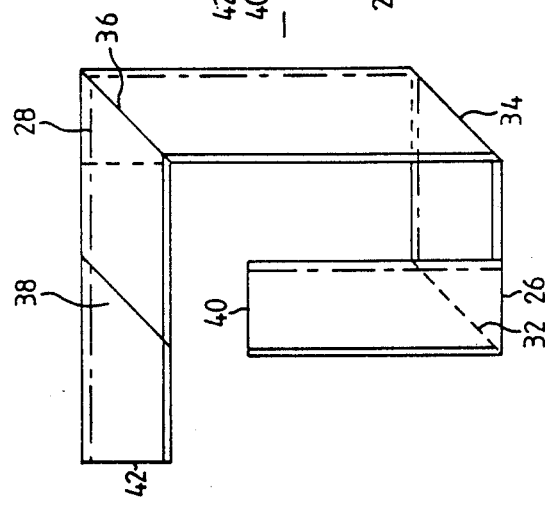
Figure 6:
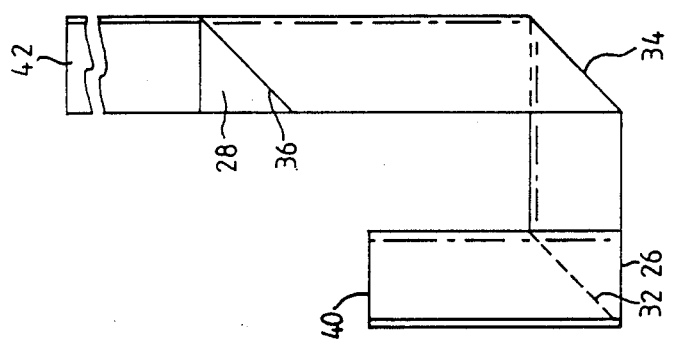
Figure 9:
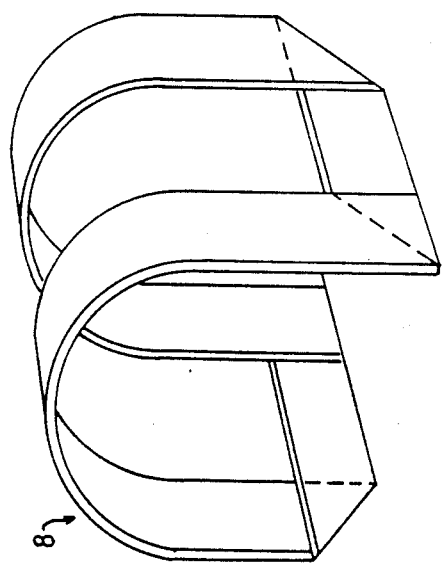

The planar configuration of the coils as shown in FIG. 8 can be used in some circumstances. In the preferred arrangement of the invention however, the coils are generally U-shaped and accordingly the loom 8 is rotated generally about axis 48 so as to assume the three dimensional configuration of the loom 8 as shown in FIG. 9. Other coil configurations could be used such as spirals.

In the preferred embodiment, the overlapped portions of the cable 10 are adhered together so as to minimize the possibility of unwanted relative movements. The loom 8 can be mounted on the outer surface 6 of the body 4 by means of an adhesive or double sided adhesive tape.

Figure 10:
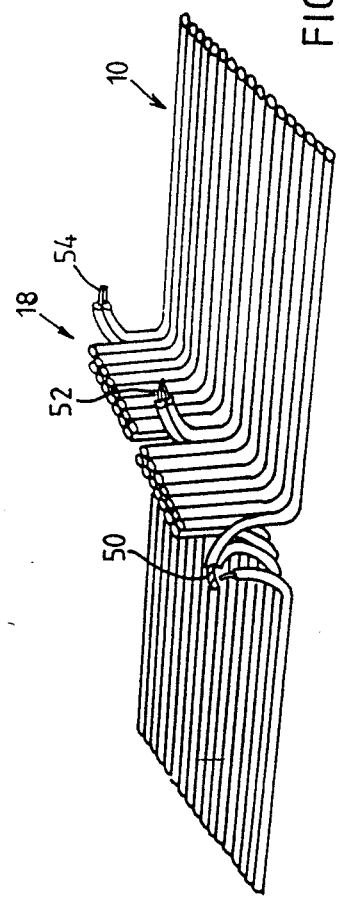
FIG. 10 shows connections at the abutting ends of the ribbon cable.

FIG. 10 illustrates the preferred technique for forming connections 18 at the abutting ends 40 and 42 of the cable 10. It will be seen that the ends of the conductors are bent through about 90° so as to extend generally parallel to one another away from the plane of the conductor 10. Selected pairs of conductors can have the insulation stripped therefrom and solded so as to form connections as illustrated by connections 50, 52 and 54. It will be appreciated that by this technique conductors can be connected in parallel or in series. Normally series connections are formed so that the coils 12 and 14 have a selected number of turns, usually from one to six. The third coil usually has more turns, say 12. It is noted in passing that not all of the conductors need be used in forming the coils 12, 14 and 16. Those which are not used do not affect the electrical or magnetic properties of the coils but contribute substantially to the mechanical stability of the arrangement and the equality of area of the coils by fixing the position of the coils with respect to each other. Connections from the cable or cables 20 can also be made at appropriate places to the connections 50, 52 and 54.

FIG. 11 shows one circuit configuration for a metal detector incorporating the head 2. The circuit includes an sine wave oscillator 60 which produces an output in the range from 1 kHz to 1 MHz. The output is amplified in an amplifier 62 and applied to the primary winding 64 of an input transformer 66. The secondary winding 67 of the transformer is coupled to a selected number of turns of the third coil 16. In the illustrated arrangement, the third coil 16 has twelve turns and the secondary winding 67 is coupled to the central six turns. A capacitor 68 is connected across the coil 16 and the value of the capacitor is selected so that the coil 16 is tuned so that the coil and capacitor form a resonant circuit at the output frequency of the oscillator 60. This minimizes the current to the coil 16 and reduces distortion. The first and second coils 12 and 14 each include four turns, in the illustrated arrangement. One end of each of the coils 12 and 14 is earthed and the other ends are connected to respective ends of a winding 70 of a coupling transformer 72. The other winding 76 is coupled via an amplifier 78 to detection circuitry 80. The connection of the coils 12 and 14 to the winding 72 is such that voltages induced by the third coil 16 cancel and when the induced voltages are equal there will be zero volts across the winding 72 and hence zero input to the amplifier 78. When however one of the coils 12 and 14 is closer to a metallic object or particle the voltage induced therein will be different to the voltage in the other coil. Consequently a voltage difference will appear across the winding 72 thereby constituting a signal which is detected by the detection circuitry 80. The detection circuitry 80 can be the usual type used for monitoring induction balance type metal detectors and need not be described herein.

The arrangement of the invention has significant advantages. The main advantage is that previously great care had to be taken in the positioning of the coils with respect to each other so that each of the pickup coils received the same voltage from the central transmitting coil. Accurately machined narrow grooves had to be used and the coils wound into these and then individually encapsulated. Accurate balancing was hard to achieve. With the use of ribbon cable and the folding technique described the coils are inherently balanced because they are physically locked to each other within the ribbon cable. Second, it is very easy to form the loom 8 because it is simply folded in the manner described and mounted on the body 4. Any irregularities in the shape of the loom 8 affect all of the coils and hence tend to be of no consequence because the areas of all of the coils are equally affected. Similarly should there by any displacement or vibration in use of the free ends of the body 4, the effects are the same for all coils and tend to cancel out. In any event the most effective area is adjacent to the curved part of the loom, as mentioned previously.

It will be further appreciated that the use of a ribbon cable provides substantially mechanical advantages because the wide flat shap gives the cable high lateral stability in contrast to the low lateral stability which would be inherent if a single or pair of conductors where used to form the coils. Thus the loom 8 can be held on the body 4 merely by the use of an adhesive of adhesive tape whereas in many prior art arrangements, each conductor or the coil is located in a groove in the body in order to prevent lateral displacements.

Many further modifications will be apparent to those skilled in the art without departing from the spirit and scope of the invention.

What is claimed is:

1. A search head for a metal detector, said head comprising a support body and at least one conductive loop mounted on the body characterized in that the loop is formed from ribbon cable having a plurality of conductors in a single layer.

2. A head as claimed in claim 1 wherein the cable is folded such that selected conductors in said cable form loops of the same effective area.

3. A head as claimed in claim 2 wherein there are first, second and third loops, the first and second being formed at respective edges of the cable and the third loop being formed at or near the centre of the cable.

4. A head as claimed in claim 3 including means for coupling an oscillating signal to the third loop.

5. A head as claimed in claim 4 including means for monitoring signals induced in the first and second loops in response to said oscillating signal.

6. A head as claimed in claim 5 wherein the first and second coils are coupled together so that induced voltages therein subtract from one another, the arrangement being such that a difference will appear in the subtracted voltages when a metal object is closer to one or other of the first or second loops.

7. A metal detector comprising:
   a search head comprising ribbon cable folded to form first, second and third loops;
   an oscillator coupled to apply an oscillating signal to the third loop; and
   monitoring means for monitoring signals induced in the first and second loops responsive to said oscillating signal and the presence of a metal object adjacent to the first or second loops.

8. A search head for a metal detector comprising a generally U-shaped electrostatically shielded non-metallic support body and at least one induction coil mounted on the body.

9. A method of forming a search head for a metal detector, said method including the steps of folding a ribbon cable so as to form at least first, second and third loops, applying an oscillating signal to the third loop and monitoring signals induced in the first and second loops in response to said oscillating signal.

10. A metal detector including a search head, said search head including an electrostatically shielded non-metallic body having at least one induction coil mounted on the body and a recess or opening which enables the search head to be placed in juxtaposition to a conduit.

* * * * *